US011456507B2

(12) United States Patent
Waters

(10) Patent No.: US 11,456,507 B2
(45) Date of Patent: *Sep. 27, 2022

(54) BATTERY MODULE CONSTRUCTION

(71) Applicant: John E. Waters, Fishers, IN (US)

(72) Inventor: John E. Waters, Fishers, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,834

(22) Filed: Mar. 11, 2016

(65) Prior Publication Data

US 2016/0197319 A1      Jul. 7, 2016

Related U.S. Application Data

(63) Continuation of application No. 13/352,128, filed on Oct. 15, 2012, now Pat. No. 9,287,536.

(60) Provisional application No. 61/680,690, filed on Aug. 7, 2012.

(51) Int. Cl.
| | | |
|---|---|---|
| *H01M 10/42* | (2006.01) | |
| *H01M 50/209* | (2021.01) | |
| *H01M 50/20* | (2021.01) | |
| *H01M 10/0525* | (2010.01) | |
| H01M 10/052 | (2010.01) | |
| H01M 10/48 | (2006.01) | |

(52) U.S. Cl.
CPC ..... *H01M 50/209* (2021.01); *H01M 10/0525* (2013.01); *H01M 10/425* (2013.01); *H01M 50/20* (2021.01); *H01M 10/052* (2013.01); *H01M 10/488* (2013.01); *H01M 2010/4271* (2013.01)

(58) Field of Classification Search
None
See application file for complete search history.

(56) References Cited

U.S. PATENT DOCUMENTS

| | | | |
|---|---|---|---|
| 5,569,552 A | 10/1996 | Rao et al. | |
| 6,183,903 B1 | 2/2001 | Campbell et al. | |
| 2002/0145404 A1* | 10/2002 | Dasgupta | H02J 7/0013 320/116 |
| 2003/0232239 A1 | 12/2003 | Gow et al. | |
| 2004/0263117 A1* | 12/2004 | Kogan | G06F 1/1613 320/114 |
| 2005/0168190 A1 | 8/2005 | Gottsponer et al. | |
| 2006/0051667 A1 | 3/2006 | Kim | |
| 2008/0044726 A1* | 2/2008 | Feng | H01M 10/08 429/188 |
| 2008/0053967 A1* | 3/2008 | Moore | B23K 9/202 219/98 |

(Continued)

FOREIGN PATENT DOCUMENTS

| | | |
|---|---|---|
| JP | 2007-165698 | 6/2007 |
| KR | 10-2012-0048937 | 5/2012 |
| KR | 10-2012-0051237 | 5/2012 |

*Primary Examiner* — Haixia Zhang
(74) *Attorney, Agent, or Firm* — Woodard, Emhardt, Henry, Reeves and Wagner LLP

(57) ABSTRACT

Described are mechanically robust, thermally managed battery module constructions including a battery case, a reinforcing divider in the case, and battery cells housed by the reinforcing divider. The reinforcing divider defines a plurality of thermal transfer elements externalized of the battery case. A shock dampening material can be provided between the reinforcing divider and the battery case to facilitate a mechanical, shock-dampened, reinforcing integration of the divider and case.

19 Claims, 10 Drawing Sheets

(56) References Cited

U.S. PATENT DOCUMENTS

| | | |
|---|---|---|
| 2011/0003187 A1 | 1/2011 | Graaf et al. |
| 2011/0023130 A1* | 1/2011 | Gudgel .................. H01M 6/06 |
| | | 726/28 |
| 2012/0015226 A1 | 1/2012 | Kim et al. |
| 2012/0058372 A1* | 3/2012 | Park ..................... H01M 10/48 |
| | | 429/93 |
| 2012/0114999 A1 | 5/2012 | Park et al. |
| 2012/0225331 A1 | 9/2012 | Tartaglia |
| 2013/0157099 A1 | 6/2013 | Anderson |

* cited by examiner

BATTERY MODULE CONSTRUCTION

REFERENCE TO RELATED APPLICATION

This application is a continuation of U.S. application Ser. No. 13/652,128, filed Oct. 15, 2012, which claims the benefit of priority of U.S. Provisional Patent Application Ser. No. 61/680,690 filed Aug. 7, 2012, and entitled Battery Module Construction, each of which is hereby incorporated herein by reference in its entirety.

BACKGROUND

The present invention relates generally to batteries and components therefor, and in certain embodiments to battery modules including a plurality of connected battery cells housed within a reinforcing divider contained within and mechanically integrated to reinforce a battery case.

Technologies in the fields of battery materials and chemistries have advanced significantly in the past few decades. The use of batteries, off-grid, to power a multitude of transportation and utility apparatuses is growing. Many of these uses, however, put high physical and performance demands upon the batteries. This can be particularly true in regions where grid power has traditionally been unavailable.

Batteries in general, and more particularly lithium-ion batteries, present challenges. For instance, variations in electrical storage with operating temperatures are often experienced which can decrease battery life and performance. Lithium-ion and other batteries can lose capacity at an accelerated rate when stored or operated in higher temperature environments. Complicating the matter is the fact that some lithium-ion batteries tend to increase temperature during operation due to Joule heating within the batteries. As the temperature of some lithium-ion batteries increases to a destructive level, cells within the batteries can become unstable and begin internally discharging across their negative and positive terminals. This discharge can generate Joule heating and warm the battery further. In turn, the increasing temperature causes further instability, discharge, and (potentially) the loss of the battery.

Another challenge with many modern battery designs stems from the fact that battery cell constructions are physically vulnerable. Illustratively, lithium ion battery chemistry is often encompassed in a "soft pouch" or "pouch cell" format, where the internal components and chemistries are incorporated within a flexible polymeric pouch. If this pouch is damaged, leaks can result which can potentially create electrical "short" circuits that can lead to battery loss. Similar issues can be experienced with other mechanically vulnerable battery cell constructions.

In light of the background in this area, needs exist for improved and/or alternative battery module constructions, which provide effective mechanical protection and/or thermal management features for incorporated battery cells and for extending the functional life of the module as a whole. In certain of its aspects, the present invention is directed to these needs.

SUMMARY

In one aspect, provided is a battery module including a polymeric case defining a plurality of openings in a wall thereof. A shock dampening material is received within the polymeric case, and a monolithic, thermally-conductive, reinforcing divider is at least partially received within the polymeric case. The monolithic, thermally-conductive, reinforcing divider is arranged to structurally reinforce the polymeric case, with the shock dampening material positioned between the reinforcing divider and the polymeric case and operable to dampen and transfer forces between the polymeric case and the reinforcing divider. The monolithic, thermally-conductive, reinforcing divider includes a plurality of dividing wall members defining a plurality of cavities therebetween, with the cavities located within the polymeric case. The monolithic, thermally-conductive reinforcing divider also defines a plurality of thermal transfer projections received through respective ones of the openings of the polymeric case and providing thermal transfer members projecting externally of the polymeric case. Lithium ion battery pouch cells are received within the polymeric case and include lithium ion battery pouch cells received at least partially in respective ones of the divider cavities. An electronic control board is received within the polymeric case and electrically couples the lithium ion battery pouch cells in series to provide a battery pouch cell series or module. Negative and positive electrical terminals are electrically coupled to the battery pouch cell series on respective ends thereof. In preferred forms, the reinforcing divider is composed of extruded aluminum, which can potentially be modified post-extrusion, e.g. by machining, to incorporate additional features. The reinforcing divider can also define at least one external reinforcing scaffolding structure that includes a plurality of elongate scaffold walls extending in a first direction and a plurality of cross-scaffold walls extending in a second direction transverse to said first direction and connecting the elongate scaffold walls. The battery case can include at least first and second case portions which are sealed together to form an enclosure, for example at mating peripheral rims or lips provided on each portion.

In another embodiment, provided is a battery module including a battery case and a monolithic divider element at least partially received within the battery case. The monolithic divider element includes a plurality of dividing wall members defining a plurality of cavities therebetween. A plurality of battery cells are received within the case and includes battery cells received at least partially in respective ones of the divider cavities and electrically connected to provide a battery cell series. A negative electrical terminal is electrically coupled to a first end of the battery cell series, and a positive electrical terminal is electrically coupled to a second end of the battery cell series. In certain embodiments, the divider element is composed of extruded aluminum, and or defines at least one external reinforcing scaffolding structure including a plurality of elongate scaffold walls extending in a first direction and a plurality of cross-scaffold walls extending in a second direction transverse to the first direction and connecting the elongate scaffold walls. In addition or alternatively, the battery module can include a shock dampening material positioned between the divider element and the battery case. The monolithic divider element can be only partially received in the battery case, and can define one or more thermal transfer elements, desirably a plurality of thermal transfer elements, exposed externally of the battery case. The transfer elements can be in heat transfer relationship with the dividing walls, and the dividing walls can be in heat transfer relationship with the battery cells.

In another embodiment, provided is a battery module including a battery case and a divider element at least partially received within the battery case. The divider element includes a plurality of dividing wall members defining a plurality of cavities therebetween. A plurality of battery cells is received within the polymeric case and including battery cells received at least partially in respective ones of said cavities and electrically connected in a battery cell series. A negative electrical terminal is electrically coupled to a first end of the battery cell series. A positive electrical terminal electrically coupled to a second end of the battery cell series. Beneficial variants of such embodiments include those containing unique structural and/or spatial positioning of thermal transfer elements potentially in combination with one or more additional features as described for the embodiments in the Detailed Description below.

Still further embodiments relate to methods of making and methods of using battery modules as described herein.

Additional embodiments, as well as features advantages of aspects of the invention, will be apparent to persons of ordinary skill in the relevant art from the descriptions herein.

DETAILED DESCRIPTION

Figure 1:
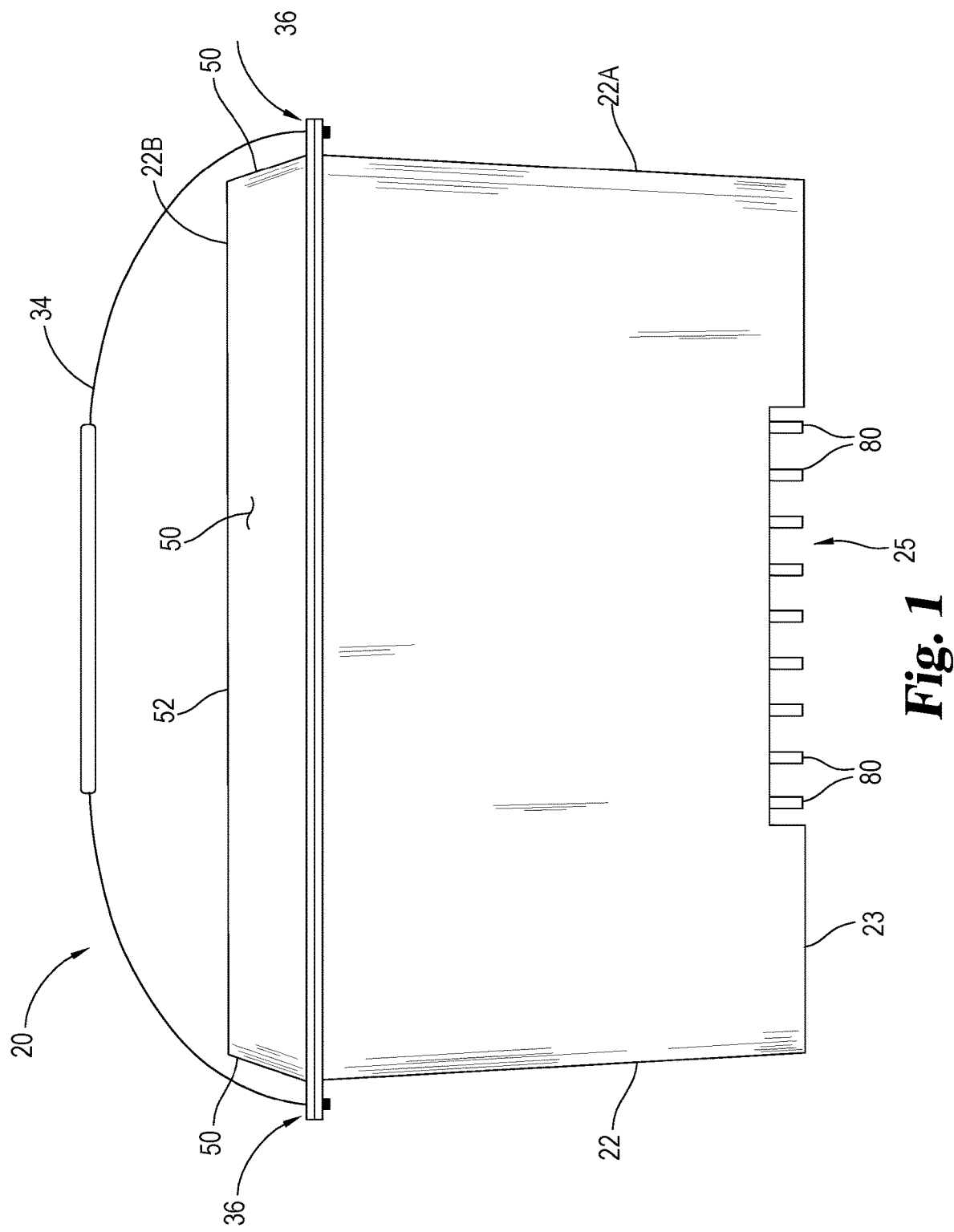
FIG. 1 provides a perspective view of one embodiment of a battery module.

For the purposes of promoting an understanding of the principles of the invention, reference will now be made to certain embodiments thereof and specific language will be used to describe the same. It will nevertheless be understood that no limitation of the scope of the invention is thereby intended, and alterations and modifications in the referenced embodiments, and further applications of the principles of the invention as illustrated herein are contemplated as would normally occur to one skilled in the art to which the invention relates.

As disclosed above, in certain aspects, the present invention pertains to battery modules, and methods and components for assembling the same. Referring now generally to FIGS. 1 to 9 together, shown is one embodiment of a battery module 20 of the invention. Battery module 20 includes an outer battery case 22, which is desirably composed of an impact-resistant polymeric material such as glass-reinforced polypropylene, a polymeric/carbon fiber composite, or the like. Battery module 20 also includes a reinforcing divider element 24 that is partially received within the interior of battery case 22. The reinforcing divider 24 is desirably a monolithic, thermally-conductive member that serves multiple purposes, including structurally reinforcing the battery case 22 to provide mechanical stability to module 20, as well as defining cavities for housing battery cells, such as lithium ion battery pouch cells 26. Reinforcing divider 24 also defines a plurality of thermal transfer element 80 that are positioned at least partially exterior of the interior enclosure of battery case 22, as discussed further below. In the preferred embodiment shown, thermal transfer elements 80 extend beyond a bottom wall 42 defined by case 22. Case 22 further defines a lip 23 extending below bottom wall 42 of case 22 and which is constructed and arranged to support the weight of module 20. Lower lip 23 can extend below bottom wall 42 sufficiently to reduce or eliminate any weight to be supported by thermal transfer elements 80 when module 20 is supported on a surface by lip 23. For these purposes, lower lip 23 can extend below bottom wall 42 a distance that is at least equal to, and desirably greater than, the distance that thermal transfer elements 80 extend below bottom wall 42. Lip 23 can define at least one opening, and desirably a plurality of openings 25, when module 20 is resting on a surface. This can serve to allow ventilation of the space underneath module 20, in which thermal transfer elements 80 reside, when module 20 is resting on a surface as supported by lip 23.

Battery module 20 also includes a control board 28 or other means electrically connecting the battery cells 26 to provide cell group(s) in series and/or parallel, a positive terminal 30, and a negative terminal 32 connected to the battery cell group(s). As well, battery module 20 can include a handle member 34 for carrying module 20, which can as illustrated be comprised of flexible straps and a grip connected to the battery case 22, for example by securing straps of handle 34 through openings 36 provided in a flange of case 22. Also, positioned within the battery case 22, between the case 22 and the reinforcing divider 24, is shock dampening material 38. Shock dampening material 38 can be provided as a singular unit or substance or can be provided at multiple, selected locations, interposed between and contacting surfaces of the reinforcing divider 24 and battery case 22. In this manner a stable fit of the divider 24 within the case 22 can be provided, that will prevent shifting of the divider 24 within the case 22 and mechanically integrate the divider 24 and the case 22 so that the divider 24 can serve to reinforce the case 22 against impact or shock forces imparted to the exterior of case 22. Desirably, reinforcing divider 24 will be reinforcibly mated in this fashion with at least the sidewalls and the bottom wall of the battery case 22. Suitable shock dampening materials 38 may include, for example, polymer foam materials such as PORON® Urethane foam (Rogers Corporation, USA) and/or elastomeric and/or polymeric substances (e.g. silicone or other rubbers), which may also serve as adhesives to bond the reinforcing divider 24 to the battery case 22.

Figure 2:
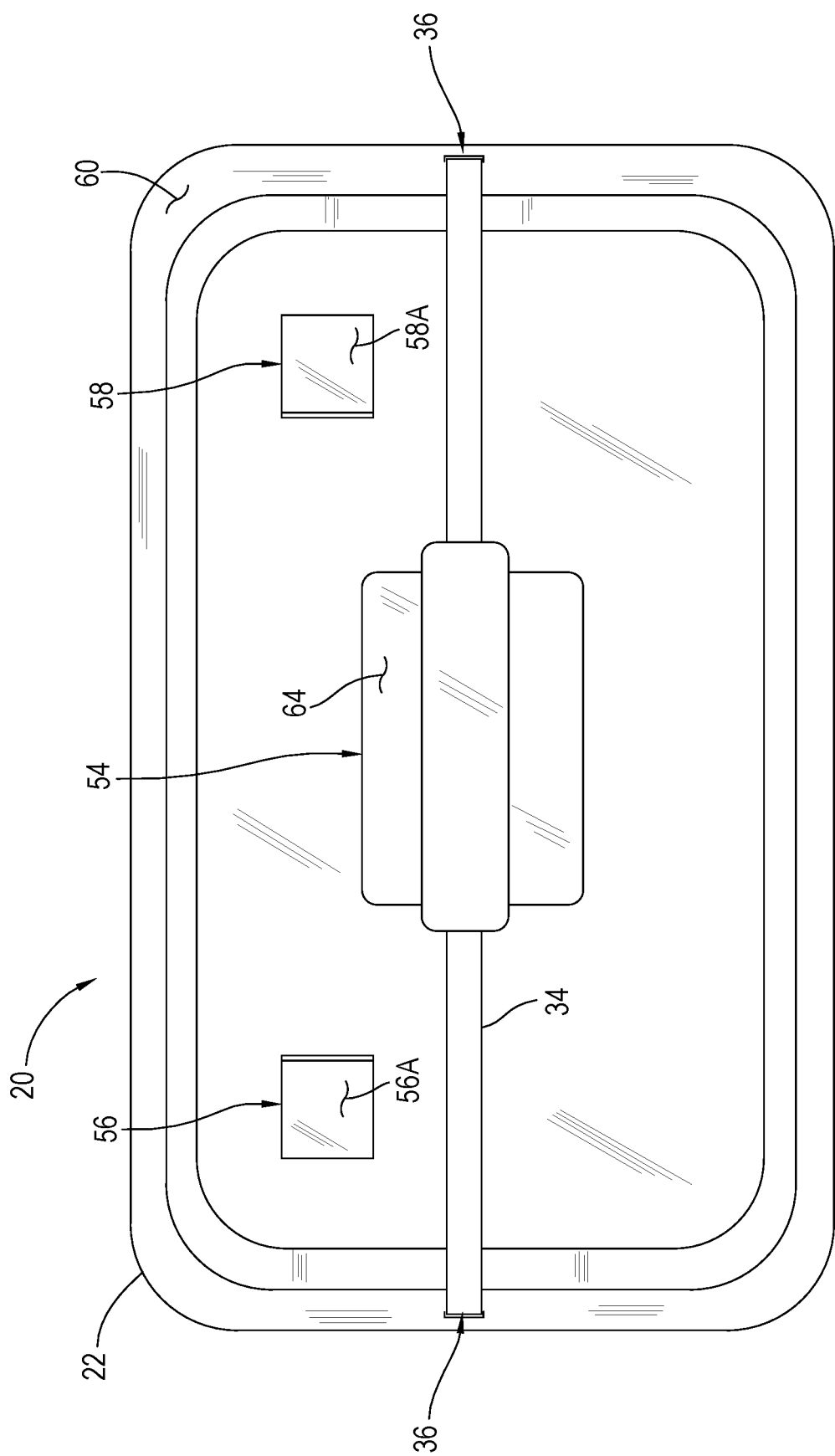
FIG. 2 provides a top view of the battery module of FIG. 1.
Figure 3:
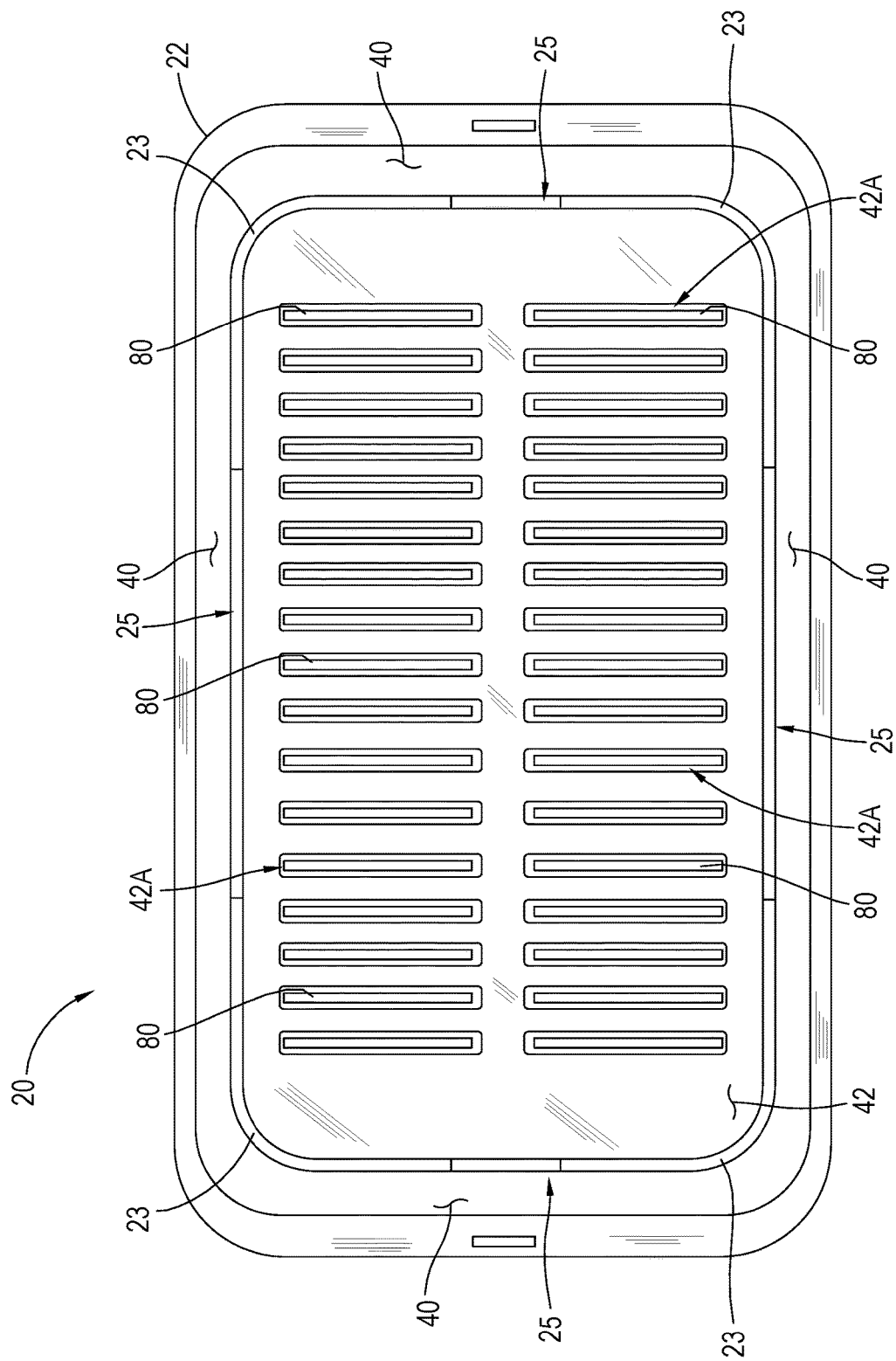
FIG. 3 provides a bottom view of the battery module of FIG. 1.
Figure 4:
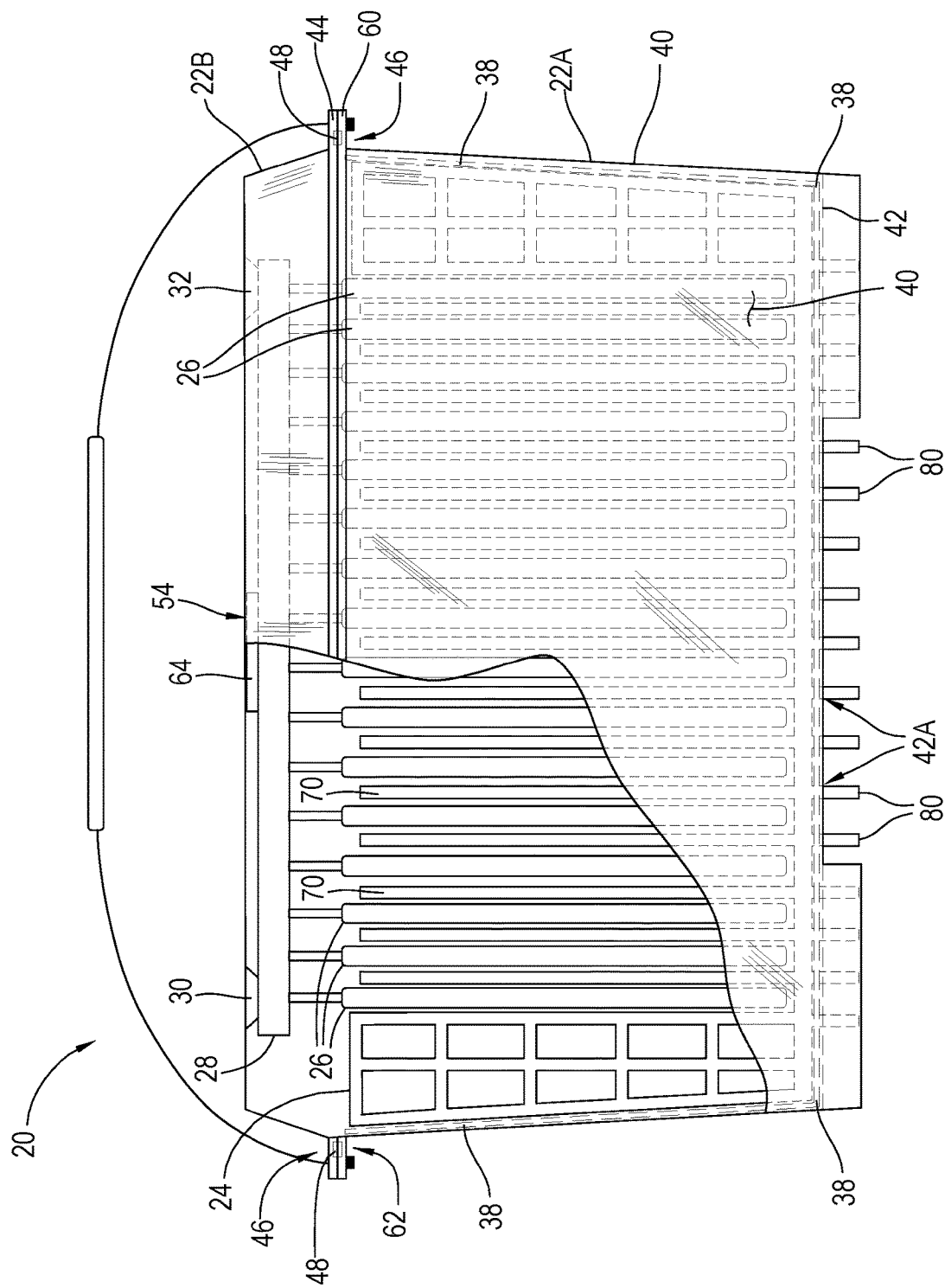
FIG. 4 provides a partial cut-away view of the battery module shown in FIG. 1 and illustrating internal components thereof.
Figure 4A:
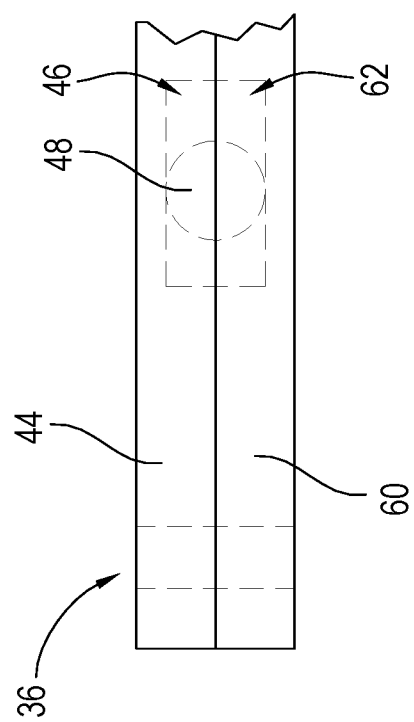
FIG. 4A provides an enlarged cut-away view of a section of the peripheral flange of the battery case as shown on the left side of FIG. 4.

Turning now to a more detailed discussion of various components of the battery module 20, shown in FIG. 4 is a partial cut-away view of the battery module 20 illustrated in FIGS. 1 to 3. Battery case 22 includes a lower portion or tub 22A and an upper portion or cap member 22B. Tub 22A defines an internal volume generally larger than that of cap member 22B, with tub 22A including side walls 40 connected to bottom wall 42. Bottom wall 42 defines a plurality of openings 42A (see FIGS. 3 and 8), such as slots, which are arranged to receive therethrough projecting thermal transfer members 80 defined by the reinforcing member 24. Case tub 22A also defines a peripheral flange 44, which can be used for sealing engagement with battery case cap member 22B. Peripheral flange 44 can define a cavity such as a slot 46 (shown in phantom in FIG. 4; see also enlarged cutaway section in FIG. 4A, and FIG. 8), for receipt of a compressible seal member 48 (phantom, FIG. 4) to aid in creating a sealed environment, desirably a hermetically or other moisture-proof sealed environment, within the assembled battery case 22. Battery case cap member 22B defines sidewalls 50 and a top wall 52. Top wall 52 defines a number of openings including a first opening 54 for receipt of a display screen 64 for displaying information, for example about the status of one or more conditions of battery module 20. Top wall 52 also defines openings 56 and 58 for receipt of and providing access to positive 30 and negative 32 terminals of battery module 20. Cap member 22B can also in certain embodiments define terminal covers 56A and 58A which are arranged to reversibly cap or cover openings 56 and 58, respectively, to enable selective protection of terminals 30 and 32 from environmental conditions such as contaminants, moisture, or others. Covers 56A and 58A can for example be caps that are secured to capping member 22B by a molded, living hinge. Cap member 22B also defines a peripheral flange 60 arranged to mate with peripheral flange 44 of tub 22A. Peripheral flange 60 can define a cavity 62 such as a slot (shown in phantom, FIG. 4; see also enlarged cut away section in FIG. 4A, and FIG. 9), for alignment with slot 46 of flange 44 of tub 22A, for capturing and compressing the seal member 48 within a seal cavity defined by cavities 46 and 62 combined. In the assembly of battery casing 22, the tub 22A and cap member 22B can be attached to one another in any suitable manner including for example the use of an ultrasonic weld between flanges 44 and 60, respectively, the use of adhesive or bonding agents, the use of suitable connectors such as bolts and nuts, or any other suitable means.

Within the battery case 22 when assembled, electronic control board 28 electrically connects pouch cells 26, for example in series and/or parallel in groups. This electrical connection can be made in any known manner including for example by ultrasonic welding of the positive and negative electrodes of the pouch cells 26 to control board tabs, where the control board contains the necessary conductive materials to arrange the connected pouch cells 26 in series and/or parallel as desired. In addition to providing the cell connectivity, the control board 28 can contain circuitry, software and/or other components for sensing and/or communications, cellular or global positioning satellite signaling for purposes of locating or tracking module 20, and/or for data transfer, including in some embodiments two-way data transfer. Some or all sensed conditions of the cell, or information relating to communications, signaling or data transfer, can be displayed on a display 64 coupled to control board 28. Display 64 may, for example, be a liquid crystal display (LCD). Such a display 64 may, for example, display the state of charge and/or state of health of the battery module or of individual or groups of battery cells within the battery module 24, and may for example common indicators of health of charge such as a selected color like red, yellow, or green to signify a state of charge or health of the battery module 20. The inclusion of electronics for communication and data transfer can provide for the generation of electromagnetic signals by the module 20 or other modules of the invention for remote reporting and/or data collection with regard to sensed conditions of and/or location of the battery module 20 and potentially also for receiving signals for control of operation(s) of the module 20 from remote locations, and can for example utilize cellular and/or satellite communications networks for these purposes. These electronics are incorporated into the control board (e.g. control board 28) in certain embodiments.

Control board 28 is also electrically connected to a positive electrical terminal 30 and a negative electrically terminal 32, which as will be understood are ultimately connected to the pouch cell or cells 26, and which provide electrical access to draw upon the electrical potential stored by battery module 20. Terminals 30 and 32 can provide either male or female type connectors for connecting to cables or other conductive members, with female connectors being provided in some preferred embodiments. It will be understood that as located upon control board 28, terminals 30 and 32 will be arranged to correspond in location with openings 56 and 58 in cap member 22B, respectively, and that display 64 will be arranged to correspond in location with opening 54 in cap member 22B. It will also be understood that these components 66, 68 and 64 can be sealingly received in or through openings 56, 58 and 54, potentially with the use of gaskets or sealants or the like, to facilitate a sealed environment within case 22.

Figure 5:
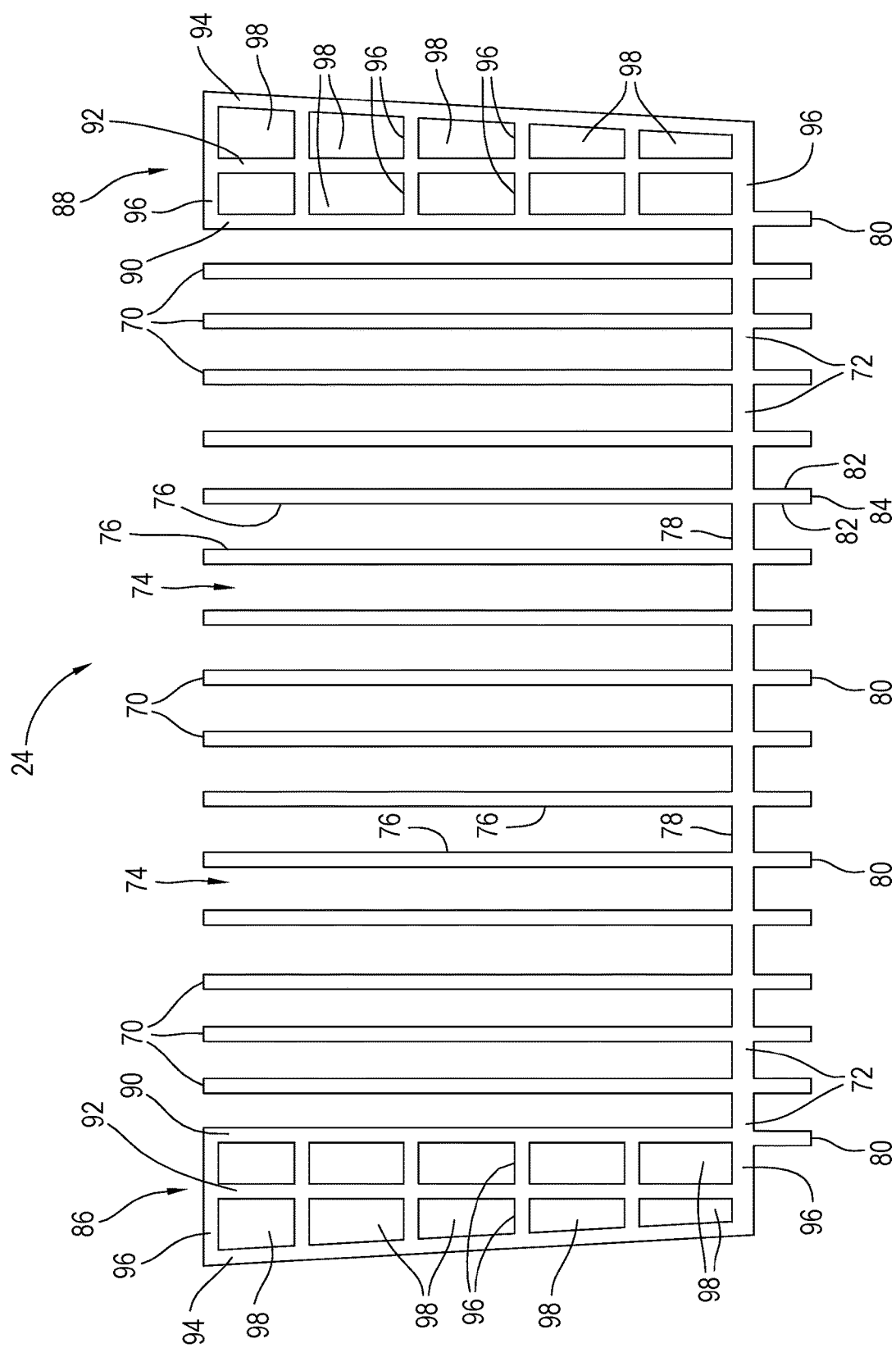
FIG. 5 provides a front view of the reinforcing divider of the battery module of FIGS. 1 to 4.
Figure 6:
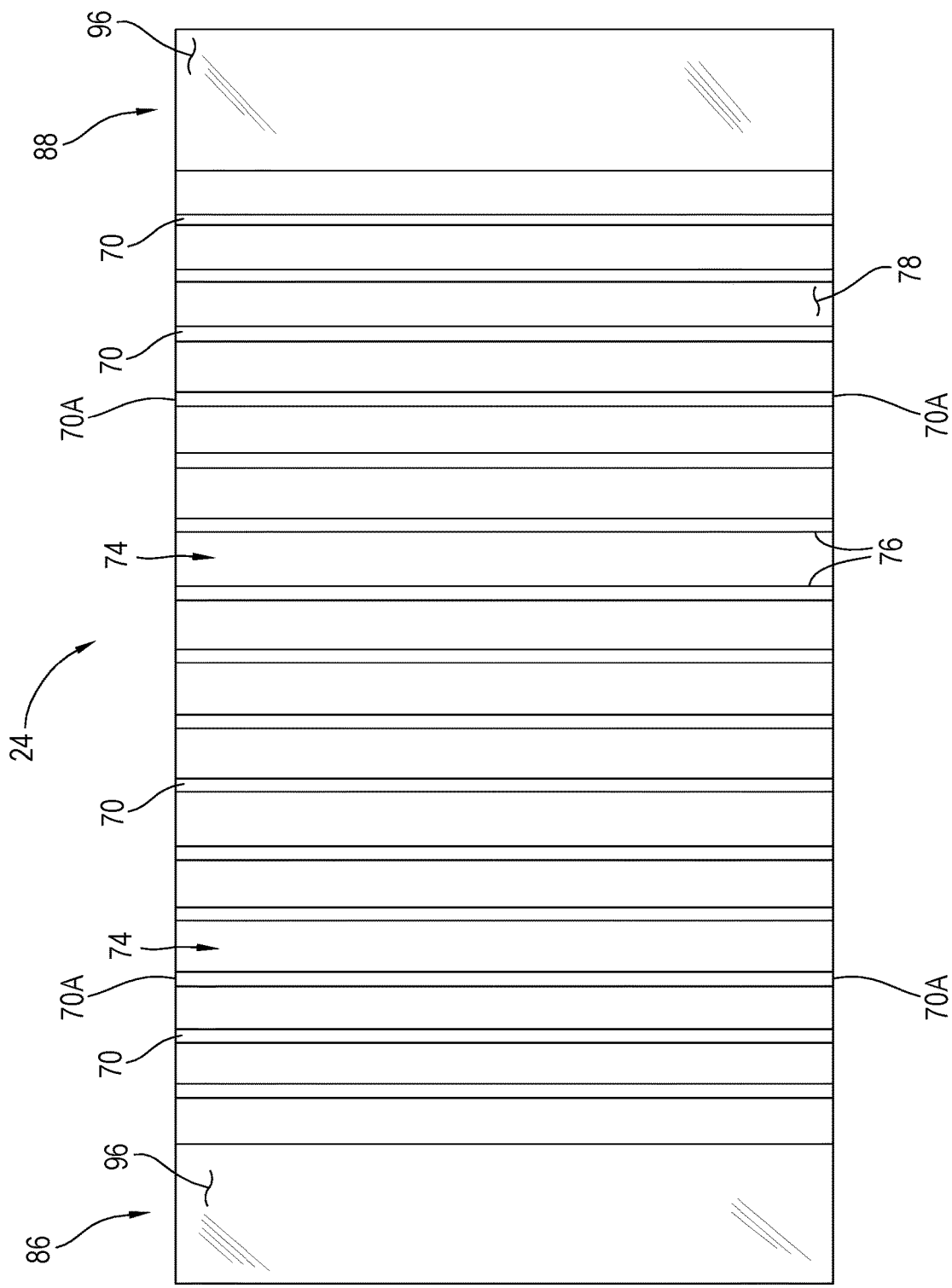
FIG. 6 provides a top view of the reinforcing divider shown in FIG. 5.
Figure 7:
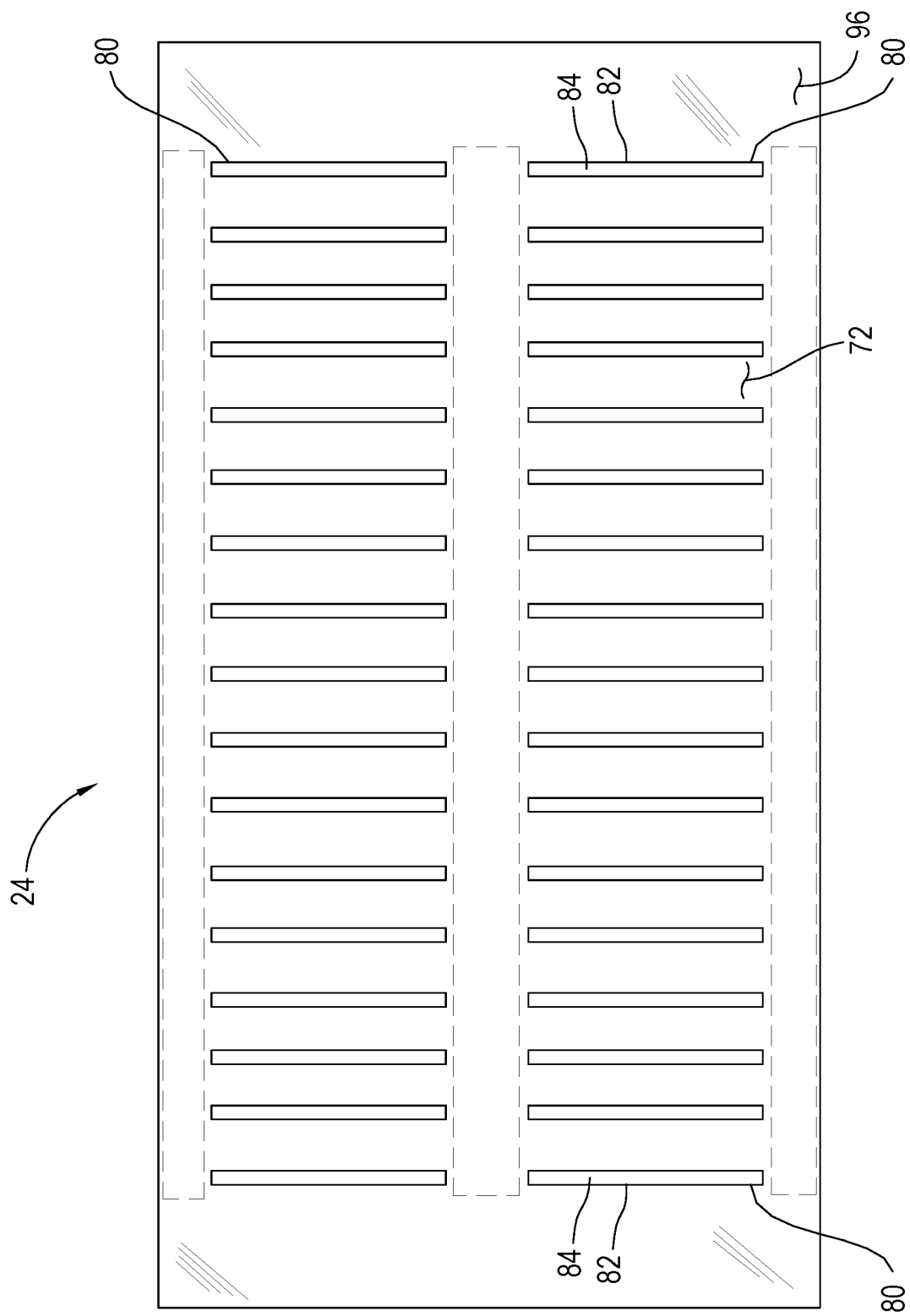
FIG. 7 provides a bottom view of the reinforcing divider shown in FIG. 5.

With particular reference to FIGS. 5 to 7, shown are front, top and bottom views, respectively, of multi-purpose reinforcing divider 24. Divider 24 includes a plurality of wall members 70 which in the depicted embodiment are arranged in generally parallel fashion relative to one another. Wall members 70 are connected by a set of transverse wall members 72 which retain wall members 70 in positions spaced from one another. Cross walls 72 can in certain embodiments be thicker than dividing wall members 70. Reinforcing divider 24 thereby defines a plurality of cavities 74, in the depicted embodiment in the form of slots, which are defined between sidewalls 76 of adjacent wall members 70. A lower wall 78 of slots 74 is defined by an upper surface of the cross wall members 72. Reinforcing divider 24 also defines a plurality of thermal transfer elements 80 which are connected to cross wall members 72. In the depicted embodiment, thermal transfer elements 80 generally form continuing portions of wall members 70 occurring on the opposite side of cross walls 72. Other arrangements are of course possible within the scope of the invention. Thermal transfer elements 80 include sidewalls 82 and a bottom wall surface 84, to be exposed exterior of the interior enclosure defined by battery case 22 in the depicted embodiment (See e.g. FIG. 1, bottom). As shown particularly in FIG. 7, thermal transfer members 80 are provided in two rows. This arrangement can be provided by modification of an extruded member (e.g. extruded aluminum or other metal) extruded to a continuous shape having the profile shown in FIG. 5. This modification can include removal of sections of the lowermost wall portions from which thermal transfer elements are formed (see dotted-line rectangular boxes in FIG. 7 representing areas where extruded wall sections have been removed), for example by machining, to result in the rows of elements 80 as shown. Appropriate finishing of the machined or otherwise modified extruded piece, for example using polishing or other smoothing operations, can be applied in the manufacture of the reinforcing divider 24.

Reinforcing divider 24, in the preferred embodiment depicted, also includes integrated external reinforcing scaffolding structures 86 and 88. Reinforcing scaffolding structures 86 and 88 each include a plurality of elongate scaffold walls 90, 92, 94 extending in a first direction and a plurality of cross-scaffold walls 96 extending in a second direction transverse to the first direction, and connecting the elongate scaffold walls 90, 92, 94. Reinforcing scaffolding structures 86 and 88 can thereby define a plurality of closed cells 98. The outermost walls 94 of scaffolding structures 86 and 88 can extend non-parallel to walls 90 and 92 and to walls 70, and in preferred embodiments are each inclined at an angle to position them, when divider 24 is received in battery case 22, in a substantially parallel plane to adjacent sidewalls of the battery case 22 that the walls 94 will reinforce. Scaffolding structures 86 and 88 can provide enhanced mechanical strength and increase the resistance of the reinforcing divider 24 to damage from impact forces directed at the outer surfaces of scaffolding structures 86 and 88.

Figure 8:
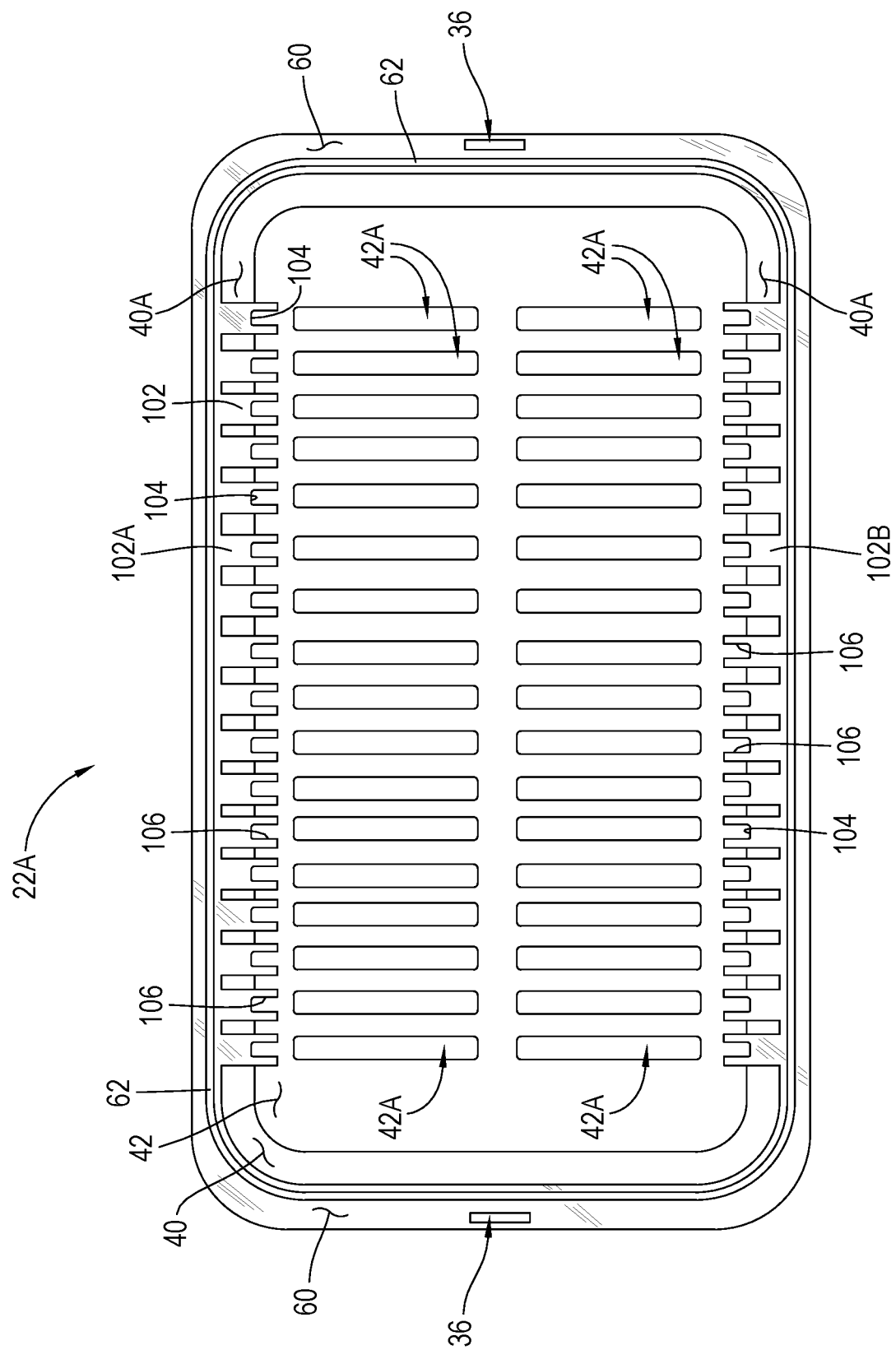
FIG. 8 provides a view of the inside of the battery case tub of the battery case of the battery module of FIGS. 1 to 4.
Figure 9:
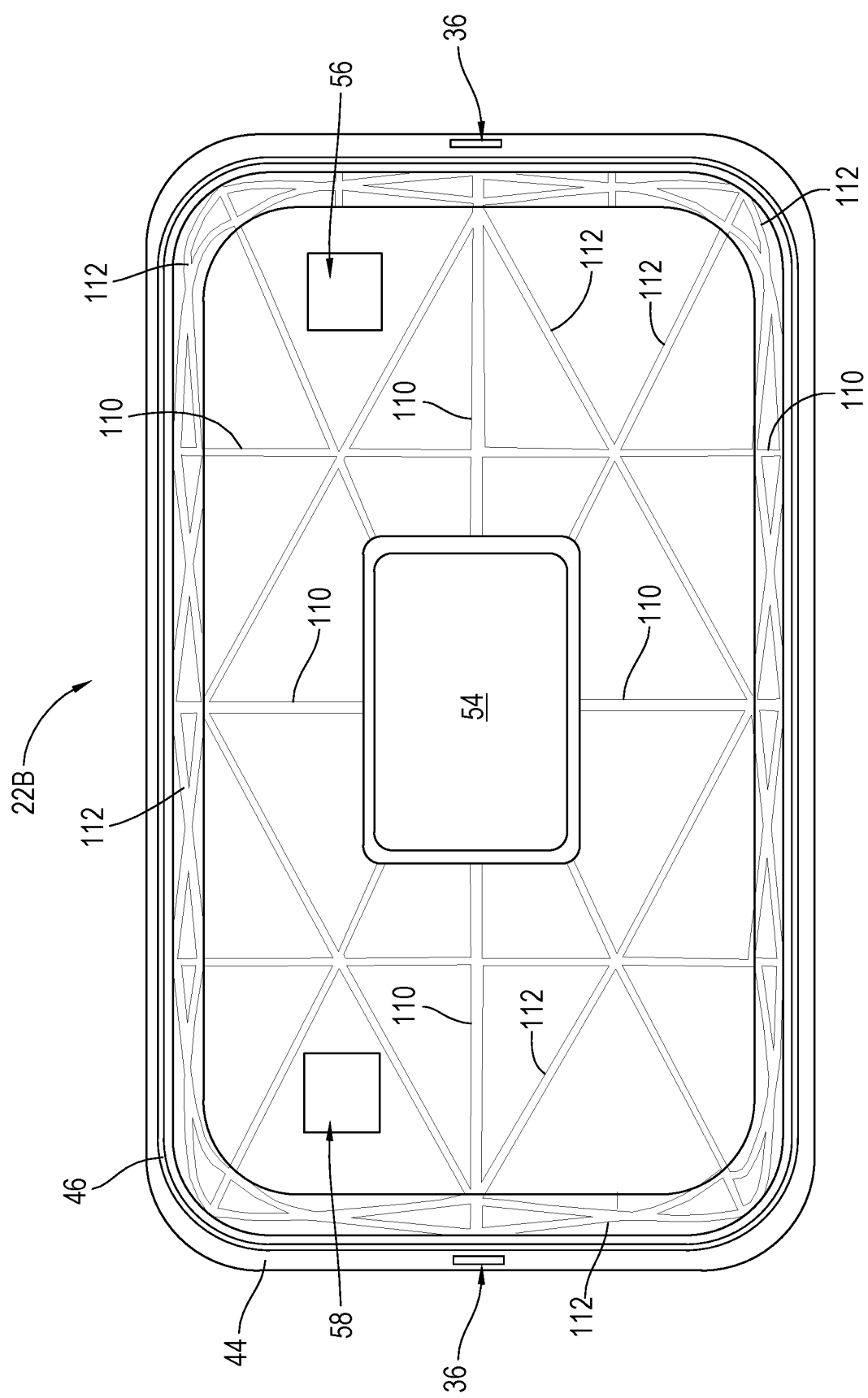
FIG. 9 provides a plan view of the inside of the battery case cap member of the battery module of FIGS. 1 to 4.

Shown in FIGS. 8 and 9 are views illustrating the interior regions of the battery case tub 22A and the battery case cap member 22B, respectively. In FIG. 8, the plurality of bottom wall openings 42A can be clearly seen. As shown, the openings 42A are provided in two sets extending along the length of tub 22A, divided by a central wall region 100 which spans between first lateral end wall portion 102 and second lateral end wall portion 104. As shown, rows of dimensionally identical openings, in the depicted embodiment slots, occur on either side of central wall portion 100. It is preferred that the bottom wall of tub 22A, as shown, includes at least one internal rib or wall portion 100 spanning between sets or groups of openings, to provide structural stability to the bottom wall of tub 22A. As will be understood, the thermal transfer members 80 of reinforcing divider 24 are constructed and arranged to correspond in location to the openings 42A in the bottom wall 42 of tub 22A, and to be receivable through the openings 42A. A layer or bead of shock dampening material (38, see previous Figs.) can be provided on the inner surface of bottom wall 42 of tub 22A, to contact the lower surfaces of cross walls 72 and 96 of the reinforcing divider 24 when assembled into tub 22A. This shock dampening material may also optionally be sufficient to create a sealed periphery around the 42A collectively, in groups, or individually. This can provide a lower seal for the interior region of case 22 residing above and housing the battery cells 26 and potentially electronic components of control board 28, such that gases or other potential contaminants passing into openings 42A do not pass into such interior region. Alternatively, separate sealing agents or mechanisms can be used.

Also shown in FIG. 8 is a plurality of slotted retainers 102 for capturing the lateral edge portions 70A (see FIG. 6) of walls 70 of reinforcing divider 24. Slotted retainers 102 each define a slot having a back wall 104 that is inclined relative to the inner surface 40A of the adjacent sidewalls 40, with back wall 104 preferably extending perpendicular to bottom wall 42 and thus situating in a substantially vertical plane when bottom wall 42 is positioned in a substantially horizontal plane. Further, the back walls 104 of retainers 102 aligned with one another on opposed sides of the tub 22A (e.g. retainers 102A and 102B as labeled in FIG. 8) are preferably spaced a distance from one another such that the lateral edge portions of walls 70 of retainer 24 are captured in the respective slots of the retainers, potentially frictionally engaging such lateral edge portions either with walls 104 and/or walls 106, and/or with a shock dampening material (e.g. an adhesive and/or foam material as described herein) received within the slots of the retainers 102. This further facilitates a mechanical integration of reinforcing divider 24 and battery case 22. In the preferred battery module 20, the slot back walls 106 and the lateral edges of reinforcing divider walls 70 both extend substantially vertically when module 20 is placed with the lower surface of the bottom lip 23 residing upon a horizontal surface.

Referring now particularly to FIG. 9, located on the interior of cap member 22B are a plurality of reinforcing struts or ribs that increase the structural integrity and strength of the cap member 22B. In the depicted cap member 22B, primary, thicker ribs 110 divide portions of the cap member 22B into generally quadrilateral segments, and are interconnected by secondary, thinner ribs 112 which define a plurality of triangular enclosures. The ribs, e.g. 110 and 112, can be molded integrally with the cap member 22B, and can for example be about 1 to 3 mm in height as they extend inward from the inner surface of the outer wall of the case cap member 22B. Corresponding or similar reinforcing rib structures are also desirably provided on the interior of battery case tub 22A.

In operation, battery module 20 provides a highly protected, thermally managed condition for battery cells 26. Thermal energy (heat) generated during operation of battery cells 26 can transfer to walls 70 of reinforcing divider and from there to thermal transfer elements 80 exposed externally of the sealed environment of the case 22 in which cells 26 are housed. Similarly, heat from the environment external of the battery can be transferred to battery cells 26 where cells 26 are cooler than the external environment, as may occur during charging or a non-operational state of cells 26. In some embodiments, a thermally conductive material, for example a thermally conductive adhesive material, can be positioned between and potentially contact and/or adhere the outer surfaces of cells 26 and the walls 70. The thermal management provided can aid in optimizing the performance of cells 26. In the illustrated embodiment, the thermal management of cells 26 is passive thermal management, in that no active heating or cooling fluids are circulated through or against the thermally-conductive reinforcing divider 24. It will be understood that active heating or cooling could be applied to reinforcing divider 24 in other embodiments, and divider 24, e.g. walls 70 thereof, may optionally be modified with grooves, internal lumens or cavities, to circulate heating/cooling fluids in such other embodiments. Passive thermal management is preferred, as it simplifies the design and operation of battery module 22.

It will also be understood that although the battery module 20 above has been illustrated and described in conjunction with prismatic lithium ion pouch cells 26, other battery cells may also be used including cylindrical lithium ion battery cells (in which case reinforcing divider 24 may be modified to define cylindrical cavities for housing the cells), as well as battery cells employing other battery chemistries. Further, it will be understood that a number of lithium ion cell constructions and chemistries are known and available for use in embodiments of the invention, including both wet electrolyte and solid electrolyte (e.g. polymeric) designs.

Further, additional embodiments of the invention are provided wherein a reinforcing divider, potentially monolithic and thermally conductive as described herein, is received completely within a sealed interior of a battery case, and thus providing no externalized thermal transfer elements. Such reinforcing dividers can nonetheless facilitate robust, mechanically stable battery module constructions, particularly where the reinforcing divider reinforces the battery case with a shock dampening material therebetween. Still further, embodiments are provided where the battery module has the structure shown for module 20, with externalized thermal transfer elements 80 beneficially extending below a bottom wall 42 of the battery case and even more beneficially being protected by a lower lip 23, but wherein the reinforcing divider is not monolithic but rather can be made from multiple pieces connected together by screws, bolts or other connection mechanisms. Module 20 and modified versions thereof, with externalized transfer elements extending only out of a bottom wall, provide efficient thermal management while minimizing exposure of the thermal transfer elements 80 for potentially injurious contact with users of the module, or damaging contact with other structures.

Particularly beneficial battery modules of the invention will exhibit high energy densities (power-to-weight ratios), with energy densities of at least 50 watt-hours per kilogram (Wh/kg), and generally in the range of 70 Wh/kg to 200 Wh/kg, being contemplated in certain embodiments herein. In preferred modes, the battery module will exhibit good portability, weighing less than about 12 kilograms, typically in the range of about 10 to about 12 kilograms. As well, desirable storage capacities for the battery module will be at least 1 kilowatt hour (kWh), typically in the range of about 1.5 kWh to about 2.5 kWh. A range of operational voltage capacities may be embodied, including for example at least about 36 volts direct current (DC), and typically about 48 to about 60 volts DC.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

What is claimed is:

1. A battery module, comprising:
   a battery case having a display opening in a wall of the battery case;
   a divider element at least partially received within the battery case, the divider element including a plurality of dividing wall members defining a plurality of cavities therebetween, the divider element defining a plurality of thermal transfer elements received through transfer element receiving openings in the battery case and exposed externally of the battery case, wherein the thermal transfer elements are in heat transfer relationship with the dividing wall members;
   a plurality of battery cells received within the battery case and including battery cells of the plurality of battery cells received at least partially in respective ones of the plurality of cavities in heat transfer relationship with the dividing wall members and electrically connected in a battery cell series;
   a negative electrical terminal electrically coupled to a first end of the battery cell series;
   a positive electrical terminal electrically coupled to a second end of the battery cell series;
   wherein the battery module exhibits an energy density of at least 50 watt-hours per kilogram and has an operational voltage capacity of at least 36 volts DC;
   electronics in the battery case for sending a remote reporting or data collection electromagnetic signal, and for receiving an incoming remote electromagnetic data signal, wherein the incoming remote electromagnetic data signal occurs through a cellular and/or satellite communications network, and further wherein the electronics are configured to enable control of operation of the battery module from a remote location by the incoming remote electromagnetic data signal; and
   an electronic display positioned to correspond in location to the display opening in the wall of the battery case and configured to display information relating to the state of charge of the battery module and also to display information relating to communications, signaling or data transfer to or from the battery module.

2. The battery module of claim 1, further comprising a shock dampening material positioned between the divider element and the battery case.

3. The battery module of claim 2, wherein the shock dampening material comprises a polymer foam.

4. The battery module of claim 1, wherein the remote reporting or data collection electromagnetic signal communicates a sensed condition of the battery module.

5. The battery module of claim 1, wherein the electronics are configured to enable global positioning satellite signaling for locating or tracking the battery module.

6. The battery module of claim 1, wherein the electronics comprise circuitry on a control board received within the battery case.

7. The battery module of claim 1, wherein the electronics comprise circuitry on a control board received within the battery case, and further wherein the control board provides electrical connections providing the battery cell series.

8. The battery module of claim 1, wherein the battery module exhibits an energy density of 70 watt-hours per kilogram to 200 watt-hours per kilogram.

9. The battery module of claim 1, wherein the battery module has a storage capacity of at least 1 kilowatt hour.

10. The battery module of claim 1, wherein the battery module has an operational voltage capacity of about 48 to about 60 volts DC.

11. A method for controlling a battery module, comprising:
    (a) providing a battery module according to claim 1; and
    (b) controlling operation of the battery module from the remote location via the incoming electromagnetic data signal.

12. The method of claim 11, wherein said electronics are configured to remotely report a sensed condition of the battery module, the method also comprising:
    receiving a remote report of the sensed condition of the battery module at the remote location.

13. The method of claim 11, wherein:
    the incoming electromagnetic data signal travels through the satellite communications network.

14. The method of claim 11, wherein the electronics are configured to enable global positioning satellite signaling for locating or tracking the battery module, the method also comprising:
    locating or tracking the battery module via the global positioning satellite signaling.

15. The method of claim 14, wherein the electronics comprise circuitry on a control board received within the battery case.

16. The method of claim 14, wherein the electronics comprise circuitry on a control board received within the battery case, and further wherein the control board provides electrical connections providing the battery cell series.

17. The method of claim 11, wherein the energy density is in the range of 70 watt-hours per kilogram to 200 watt-hours per kilogram.

18. The method of claim 17, wherein the battery module has a storage capacity of at least 1 kilowatt hour.

19. The method of claim 11, wherein the electronics are configured to remotely report a sensed condition of the battery module and to enable global positioning satellite signaling for locating or tracking the battery module, the method also comprising:

receiving a remote report of said sensed condition of the battery module at the remote location; and locating or tracking the battery module via the global positioning satellite signaling.

\* \* \* \* \*